United States Patent Office 3,023,102
Patented Feb. 27, 1962

3,023,102
DIRECT POSITIVE PHOTOGRAPHIC EMULSION
Fritz Dersch, Binghamton, N.Y., and Norman J. Doorenbos, Glen Burnie, Md., assignors to General Aniline & Film Corporation, New York, N.Y., a corporation of Delaware
No Drawing. Filed Sept. 24, 1957, Ser. No. 685,815
11 Claims. (Cl. 96—101)

This invention relates to photographic emulsions and in particular to a direct positive photographic emulsion containing desensitizing compounds.

It is known that exposure of a photographic silver-halide emulsion to blue light and then subsequent exposure to long-wave radiation before development results in partial destruction of the original exposure. A somewhat similar effect is the so-called "sensitized" Herschel effect wherein desensitizing dyes are used with silver-halide emulsions to produce reversal in that portion of the spectrum absorbed by the dye adsorbed to the silver-halide grains.

In the prior art, processes are described for producing direct positive images which utilize the "sensitized" Herschel effect. These prior processes suffer from such shortcomings as low reversal density, undesirable stain from the desensitizing dyes used as well as insufficient sensitivity or undesirable contrast. It is also known that emulsions which utilize the "sensitized" Herschel effect will become sensitized to white light after the reversal has been accomplished with the result that processing must be carried out in the absence of white light.

It is therefore an object of the present invention to provide a direct positive photographic emulsion.

A further object is to provide a direct positive photographic emulsion with improved speed and contrast.

A still further object is to provide a direct positive photographic emulsion of low-light sensitivity after reversal.

These objects are accomplished according to our invention by incorporating certain desensitizing compounds in combination with certain water-soluble iridate salts in a silver-halide emulsion. The emulsion may be a gelatino-silver chloride emulsion containing substantially no silver bromide or silver iodide, a gelatino-silver chloride emulsion containing silver bromide or silver iodide, a gelatino-silver bromide emulsion containing silver chloride or iodide or silver iodide emulsion containing or not containing silver chloride or bromide.

In lieu of gelatin, other water-soluble colloids such as albumin, P.V.A., and the like, may be employed.

The desensitizing dyes or compounds are added to such emulsions in amounts ranging from 400 mg. to 1.6 g. per 10 kg. of silver-halide emulsion. The desensitizing dyes or compounds may be added during the addition of silver nitrate solution to an alkali metal or ammonium halide solution in the presence of a colloid or after the addition of silver nitrate before or after washing. The iridium salt is preferentially added during the addition of said silver salt solution to the halide solution. Of these various possible iridium salts, we prefer to use ammonium chloroiridate.

The emulsion prepared with said desensitizers and iridium salts is coated on a support and flashed with white light in order to fog it. The emulsion may also be fogged chemically with formaldehyde, hydrazine, sodium arsenate, silver ions and other known non-sulfide fogging agents. The fogged material is then exposed to an image through a yellow, orange or red filter and developed in the usual way to produce a positive image.

The desensitizing compounds used are nitrostyryl dyes and are described in the co-pending application of N. J. Doorenbos, Serial Number 685,808, filed on even date herewith. These dyes have a terminal phenyl radical substituted by one or more nitro groups and is attached to a heterocyclic nitrogenous base through a conjugated carbon chain.

The styryl dye bases contemplated herein can be represented by the following general formula:

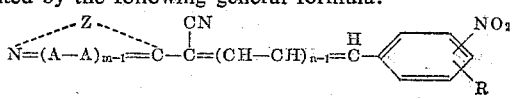

wherein R is hydrogen, halogen, i.e., chlorine, bromine, etc.; hydroxy, amino, nitro, etc.; $n$ is an integer of from 1 to 2, $m$ is an integer of from 1 to 2, A is a methine group and Z represents the non-metallic atoms necessary to complete a heterocyclic nucleus containing 5 to 6 atoms in the ring such as benzimidazole, 3-alkylbenzimidazole, e.g., 3-methyl-, 3-ethyl-, 3-propyl-, 3-butylbenzimidazole, 2- and 4-pyridine, 2- and 4-quinoline, thiazole, benzothiazole, α- and β-naphthothiazole, oxazole, benzoxazole, selenazole, benzoselenazole, 3,3-dialkylindolenine, e.g., 3,3-dimethylindolenine, 3,3,5-trimethylindolenine, wherein said heterocyclic nuclei can contain such substituents as halogen, e.g., chlorine, bromine, etc.; hydroxy, amino, nitro, etc.

Compounds within the ambit of said formula which we have found suitable are the following:

2-(α-cyano-p-nitrostyryl)benzimidazole

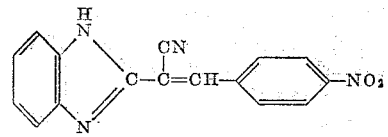

5(6)-chloro-2-(α-cyano-m-nitrostyryl)benzimidazole

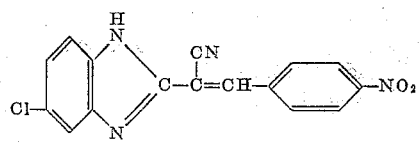

2-(α-cyano-m-nitrostyryl)benzimidazole

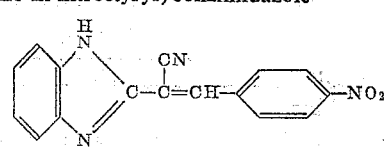

2-(α-cyano-p-nitrostyryl)-5(6)-methylbenzimidazole

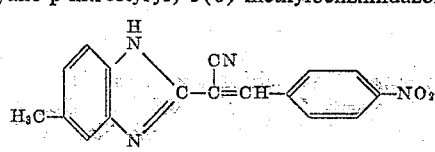

2-(α-cyano-m-nitrostyryl)-5(6)-methylbenzimidazole

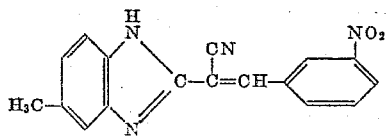

2 - [1 - cyano - 4 - (o - nitrophenyl) - 1,3 - butadienyl]-5(6)-methylbenzimidazole

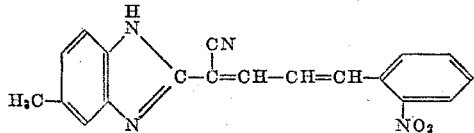

2-(α-cyano-p-nitrostyryl)-5(6)-methoxybenzimidazole

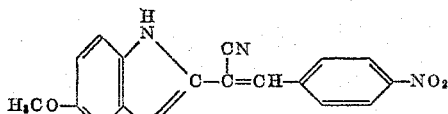

2-(α-cyano-p-nitrostyryl)pyridine

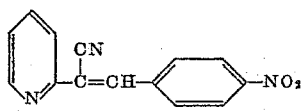

2-(α-cyano-p-nitrostyryl)quinoline

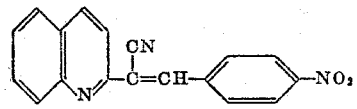

2-(α-cyano-p-nitrostyryl)benzothiazole

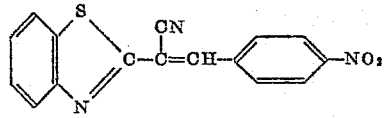

This invention will be illustrated in greater detail by the following specific examples, but it is to be understood that the invention is not restricted thereto.

*Example I*

A gelatin silver-halide emulsion was prepared as follows:

150 grams of silver nitrate were dissolved in 1000 mg. of water and then added to a solution consisting of 4000 mg. of water, 45.5 g. of sodium chloride, 10 mg. of ammonium chloroiridate and 350 g. of gelatin. The temperature of the above mixture was maintained at 60° C. After a short digestion period, 150 mg. of 2-(α-cyano-p-nitrostyryl)-5(6)-methylbenzimidazole were added. After a period of moderate heating, the emulsion was chilled, shredded and washed until the excess of soluble salts was removed. This emulsion is then coated on non-gloss paper and yields a density of 1.2 when developed in the following developer:

| | G. |
|---|---|
| Metol | 3.5 |
| Sodium sulfite (anhydrous) | 45 |
| Hydroquinone | 11.5 |
| Sodium carbonate (monohydrated) | 78 |
| Potassium bromide | 1.2 |

Water to make 1 liter.

This material was exposed to an image with light passed through a Wratten #15 filter.

*Example II*

1000 grams of the emulsion from Example I was treated after washing with 25 cc. of a 0.5% solution of 2-(α-cyano-p-nitrostyryl)-5(6)-methylbenzimidazole. The resulting emulsion produces a minimum density at maximum exposure and a high density at minimum exposure.

The reversal speed of the emulsion is approximately 1/400 that of ordinary contact printing paper, particularly when the basic photographic emulsion is a pure silver chloride emulsion.

The low sensitivity of the above-described photographic emulsions enables them to be handled under ordinary office light so that said emulsion are especially suitable for reproduction of documents, letters and drawings.

It is to be understood that the examples and modifications included herein are illustrative and restricted only by the appended claims.

We claim:

1. A direct positive photographic emulsion comprising a silver-halide emulsion containing a desensitizing compound represented by the following general formula:

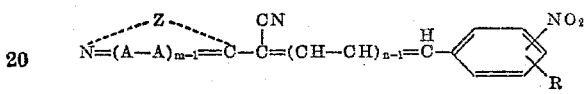

wherein R is selected from the class consisting of hydrogen, halogen, hydroxy, amino and nitro groups, n is an integer of from 1 to 2, m is an integer from 1 to 2, A is methine group and Z is a heterocyclic nucleus selected from the class consisting of benzimidazole, benzothiazole, pyridine and quinoline nuclei and about 10 mg. per 150 mg. of said desensitizing compound of a water-soluble chloroiridate salt.

2. The method of making a direct positive photographic emulsion which comprises precipitating a silver-halide in a water-soluble colloid and in the presence of a water-soluble chloroiridate salt and adding to the resulting emulsion a compound represented by the following general formula:

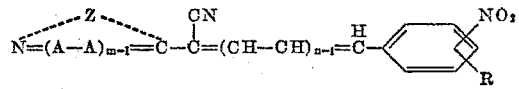

wherein R is selected from the class consisting of hydrogen, halogen, hydroxy, amino and nitro groups, n is an integer of from 1 to 2, m is an integer from 1 to 2, A is a methine group and Z is a heterocyclic nucleus selected from the class consisting of benzimidazole, benzothiazole, pyridine and quinoline nuclei the chloroiridate salt present in the emulsion being in the ratio of about 10 mg. of the salt per 150 mg. of said compound.

3. The emulsion as defined in claim 1 wherein the desensitizing compound contains, as the heterocyclic nucleus, a benzimidazole nucleus.

4. The emulsion as defined in claim 1 wherein the desensitizing compound contains, as the heterocyclic nucleus, a benzothiazole nucleus.

5. The emulsion as defined in claim 1 wherein the desensitizing compound contains, as the heterocyclic nucleus, a pyridine nucleus.

6. The emulsion as defined in claim 1 wherein the desensitizing compound contains, as the heterocyclic nucleus, a quinoline nucleus.

7. A direct positive photographic emulsion comprising a silver-halide emulsion containing from .4 gram to 1.6 grams per 10 kilograms of emulsion of 2-(α-cyano-p-nitrostyryl)benzimidazole and about 10 mg. per 150 mg. of said benzimidazole of ammonium chloroiridate.

8. A direct positive photographic emulsion comprising a silver-halide emulsion containing from .4 gram to 1.6 grams per 10 kilograms of emulsion of 5(6)-chloro-2-(α-cyano-m-nitrostyryl)benzimidazole and about 10 mg. per 150 mg. of said benzimidazole of ammonium chloroiridate.

9. A direct positive photographic emulsion comprising a silver-halide emulsion containing from .4 gram to 1.6 grams per 10 kilograms of emulsion of 2-(α-cyano-p-nitrostyryl)-5(6)-methylbenzimidazole and about 10 mg. per 150 mg. of said methylbenzimidazole of ammonium chloroiridate.

10. A direct positive photographic emulsion comprising a silver-halide emulsion containing from .4 gram to 1.6 grams per 10 kilograms of emulsion of 2-[1-cyano-4-(o-nitrophenyl) - 1,3 - butadienyl] - 5(6) - methylbenzimidazole and about 10 mg. per 150 mg. of said methylbenzimidazole of ammonium chloroiridate.

11. A direct positive photographic emulsion comprising a silver-halide emulsion containing from .4 gram to 1.6 grams per 10 kilograms of emulsion of 2-($\alpha$-cyano-p-nitrostyryl)pyridine and about 10 mg. per 150 mg. of said pyridine ammonium chloroiridate.

References Cited in the file of this patent

UNITED STATES PATENTS

| | | |
|---|---|---|
| 2,345,094 | Brooker et al. | Mar. 28, 1944 |
| 2,541,472 | Kendall et al. | Feb. 13, 1951 |
| 2,566,245 | Trivelli et al. | Aug. 28, 1951 |
| 2,669,515 | Kendall et al. | Feb. 16, 1954 |
| 2,717,833 | Wark | Sept. 13, 1955 |